July 21, 1936.     D. R. DAVIES     2,048,540
ELECTRICAL SWITCHGEAR
Filed July 16, 1934
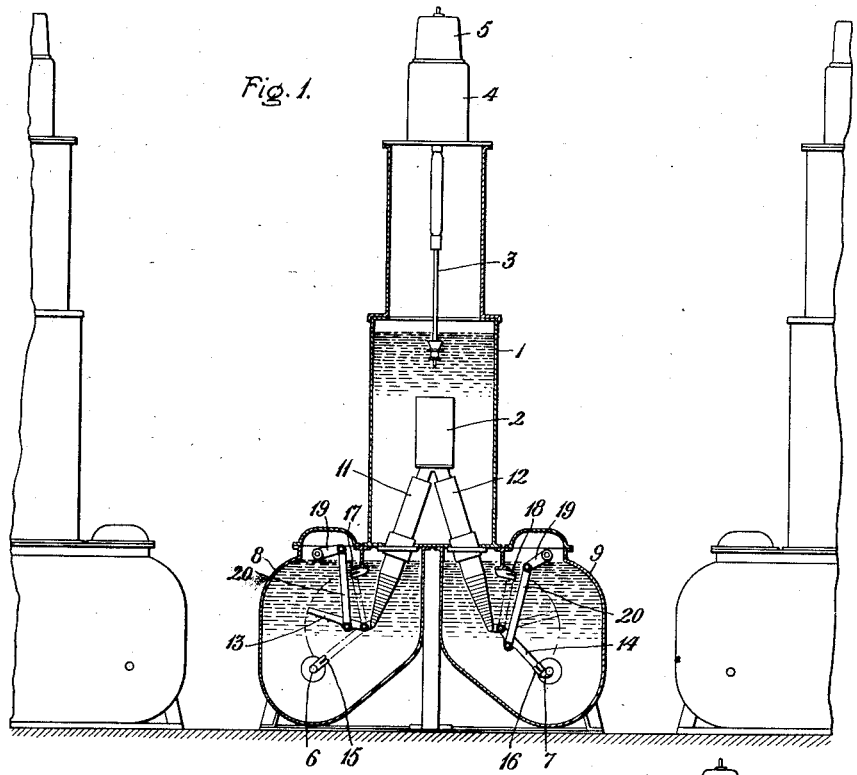
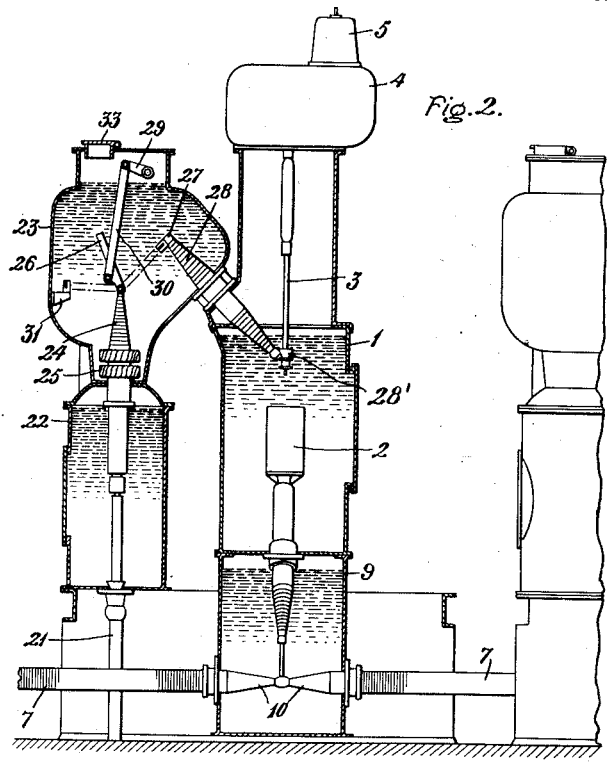
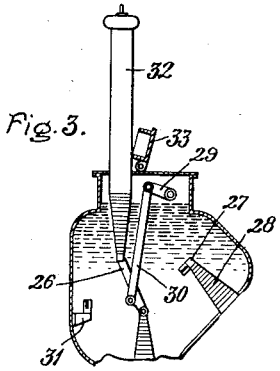
Inventor:
David R. Davies,
by Harry E. Dunham
His Attorney.

Patented July 21, 1936

2,048,540

UNITED STATES PATENT OFFICE 2,048,540

ELECTRICAL SWITCHGEAR

David Reginald Davies, Didsbury, England, assignor to General Electric Company, a corporation of New York Application July 16, 1934, Serial No. 735,483
In Great Britain July 28, 1933

4 Claims. (Cl. 175—298)

This invention relates to electrical switchgear of the metal-enclosed type for high tension transmission and distribution systems and has for its principal object improved switchgear which comprises a compact, simple and economical arrangement.

This application is related to applicant's Patent No. 1,992,024 granted February 19, 1935 for Electrical switchgear.

The present invention provides an arrangement whereby in a bus and switch station of the metal-enclosed type employing a duplicate or alternate busbar system the units associated with similar phases of such busbars may be arranged in respective rows, whereas the units associated with the branch circuits or feeders of each phase to be connected with the busbars are arranged in a small row at substantially right angles to said busbars, the said small rows of units being located one behind the other along the busbars. More particularly in accordance with the present invention, the circuit breaker tank is supported above separate T-connection chambers, which may be oil-filled, and into which the busbars associated with the circuit breaker are adapted respectively to extend, the stationary contact structure of the circuit breaker being supported upon the upper ends of a pair of bushings which extend through the circuit breaker tank at or near the base thereof into said T-connection chambers respectively. Preferably there is provided in each said T-connection chamber an isolating switch which is also capable of grounding the associated circuit breaker terminal.

This invention will be more fully set forth in the following description referring to the accompanying drawing, and the features of novelty which characterize this invention will be pointed out with particularity in the claims annexed to and forming a part of this specification.

Referring more particularly to the drawing, Fig. 1 is a front elevation, partly in section, of a single switchgear unit embodying my invention, Fig. 2 is a side elevation, partly in section, of said unit, and Fig. 3 is a portion of Fig. 2 illustrating a testing arrangement.

The switchgear unit comprises as in the aforesaid related application a switch tank 1 in which is located a fixed contact structure indicated generally at 2 with which cooperates the vertically movable rod contact member 3. The operating mechanism (not shown) is located in a casing 4 which carries an operating solenoid 5. A suitable arc-extinguishing or insulating liquid, as oil, partly fills the switch casing 1. The switch contact structure may be of any suitable type as, for example, of the well-known explosion-chamber or oil-blast types, the selection of which forms no part of the present invention.

The duplicate or main and auxiliary busbars, indicated respectively at 6 and 7 in Fig. 1 and one of which is shown at 7 in Fig. 2, are illustrated as having condenser type insulation and are arranged parallel with one another and are located below the level of the circuit breaker tank 1. The tank 1 is supported upon housings forming oil-filled T-connections or isolating switch chambers 8 and 9 into which chambers said busbars respectively extend as indicated at 10 in Fig. 2.

The fixed contact structure 2 of the circuit breaker is supported upon the upper ends of a pair of condenser bushings 11 and 12 for electrical conductors which are disposed at an acute angle with respect to one another and extend through the base of the circuit breaker tank 1 into the isolating switch chambers 8 and 9, respectively.

For the purpose of disconnecting and isolating the switch terminal represented by the contact 2 with respect to the busbars, switching means are disposed in the aforesaid chambers. The lower end of each of the condenser bushings 11 and 12 pivotally supports a movable contact member 13, 14 of an isolating switch of the knife-blade type, the contact members 13 and 14 cooperating with fixed contacts 15 and 16 which are supported upon the busbars 6 and 7, respectively, between the adjacent ends of the condenser bushings 10. Fixed grounding contacts 17, 18 are provided in the isolating switch chambers 8 and 9, respectively, said contacts being electrically connected with the metallic casing of said chambers whereby the fixed contact 2 of the circuit breaker may be grounded when desired.

As indicated, the movable contact members 13 and 14 are adapted to be operated from respective shafts each carrying a crank member 19 through an insulating link 20. In Fig. 1 the isolating switch 13 is shown in an intermediate position in which the contact 2 is isolated from the busbar 6 whereas the isolating switch 14 connects the said contact with the busbar 7.

The phase conductor of the branch circuit or feeder associated with the switchgear unit is indicated at 21 (Fig. 2) and enters a cable sealing chamber housing 22 which is oil-filled and upon which is supported an isolating switch chamber housing 23. The cable extends into the chamber 23 by means of an insulating bushing 24 upon which is located a current transformer 25. The movable contact member 26 of a knife type isolating switch is pivoted to the upper end of the bushing 24 and cooperates with a fixed contact 27 supported on the bushing 28 which extends through a side of the circuit breaker tank 1 and is suitably connected at 28' with the moving contact 3 of the circuit breaker.

The isolating switch 26 is adapted to be operated by means of a shaft and crank 29 through an insulating link 30 so as to engage either the contact member 27 or grounding contact 31, or to assume the intermediate position indicated in full lines in Fig. 2. The top of the chamber 23 is provided with an opening into which a testing cable indicated at 32 in Fig. 3 is adapted to be inserted, the lower end of the testing cable carrying a contact member adapted to be engaged by the isolating switch 26 in the position shown. A cover 33 is provided for the said opening.

The switchgear unit as described above is associated with a single phase or a single conductor of each of the busbar systems and similar units are provided for each of the other phases or conductors of the said busbar systems. The other units which on a three-phase system are associated with the same feeder as the unit above described are indicated at opposite sides of the unit above described in Fig. 1, and as will be seen from this figure the switchgear units which are associated with the conductors of a single feeder are located in a row which extends at right angles to the axis of the busbars. The phase switchgear units associated with another feeder will be located in line with the corresponding phase switchgear units along the axis of the busbars, as indicated in Fig. 2.

It should be understood that this invention is not limited to specific details of construction and arrangement thereof herein illustrated, and that changes and modifications may occur to one skilled in the art without departing from the spirit of the invention.

What I claim as new and desire to secure by Letters Patent of the United States, is:

1. A high tension metal clad bus and switch station comprising a circuit breaker having a casing enclosing relatively movable contact structure, main and auxiliary busbars, each of said busbars being mounted within a separate metallic housing including a T-connection chamber, said circuit breaker casing being mounted above and supported jointly by said housings, electrical conductors connected to the stationary contact structure of said circuit breaker arranged to extend within said T-connection chambers respectively for connecting said stationary contact structure to said busbars, an isolating switch housing separate from said circuit breaker casing, electrical conductors connected to the movable contact structure of said circuit breaker extending within said isolating switch housing, and a casing through which extends an electrical conductor from said isolating switch housing supporting said housing.

2. A high tension metal clad bus and switch station comprising a circuit breaker having a casing containing an arc-extinguishing liquid, coacting fixed and movable contact structure operable within said casing, main and auxiliary busbars, separate metallic housings including T-connection chambers for said busbars, said circuit breaker housing being mounted above and supported by said busbar housings, a pair of insulating bushings supporting said fixed contact structure and extending through the bottom wall of said circuit breaker casing into said T-connection chambers respectively, and conducting means for electrically connecting said fixed contact structure to said busbars.

3. A high tension metal clad bus and switch station comprising a circuit breaker having a casing containing an arc-extinguishing liquid, coacting fixed and movable contact structure operable within said casing, main and auxiliary busbars, separate metallic housings including a T-connection chamber for said busbars, a pair of insulating bushings extending from said T-connection chambers respectively into said circuit breaker casing, said bushings converging within said casing and jointly supporting said fixed contact structure, and isolating switching means associated respectively with the opposite ends of said bushings for cooperating with said main and auxiliary busbars.

4. A high tension polyphase metal clad bus and switch station, each phase comprising parallel main and auxiliary busbars, separate metallic housings including T-connection chambers for said busbars, a unit including a circuit breaker having a casing mounted above said T-connection chambers and supported by said housings, means including isolating switches for connecting said circuit breaker with respect to said busbars within said T-connection chambers, a branch circuit conductor having isolating switch means arranged to be connected with respect to said circuit breaker, metallic enclosing structure for said conductor and isolating switch means in alinement with said circuit breaker and busbars, the units associated with similar phases of said busbars being arranged in respective rows and the units associated with the phase conductors of a polyphase branch circuit being arranged in a row at substantially right angles to said busbars.

DAVID REGINALD DAVIES.

Certificate of Correction

Patent No. 2,048,540. July 21, 1936.

DAVID REGINALD DAVIES

It is hereby certified that errors appear in the above numbered patent requiring correction as follows: In the grant, line 6 of the testimonial clause, for "thirty-first" read *thirty-six*; page 1, second column, line 13, for "T-connections" read T-*connection*; and that the said Letters Patent should be read with these corrections therein that the same may conform to the record of the case in the Patent Office.

Signed and sealed this 1st day of September, A. D. 1936.

[SEAL.]

LESLIE FRAZER,
*Acting Commissioner of Patents.*